SYNCHRONIZING SYSTEM FOR MAGNETIC TELEVISION RECORDING
Filed March 2, 1961
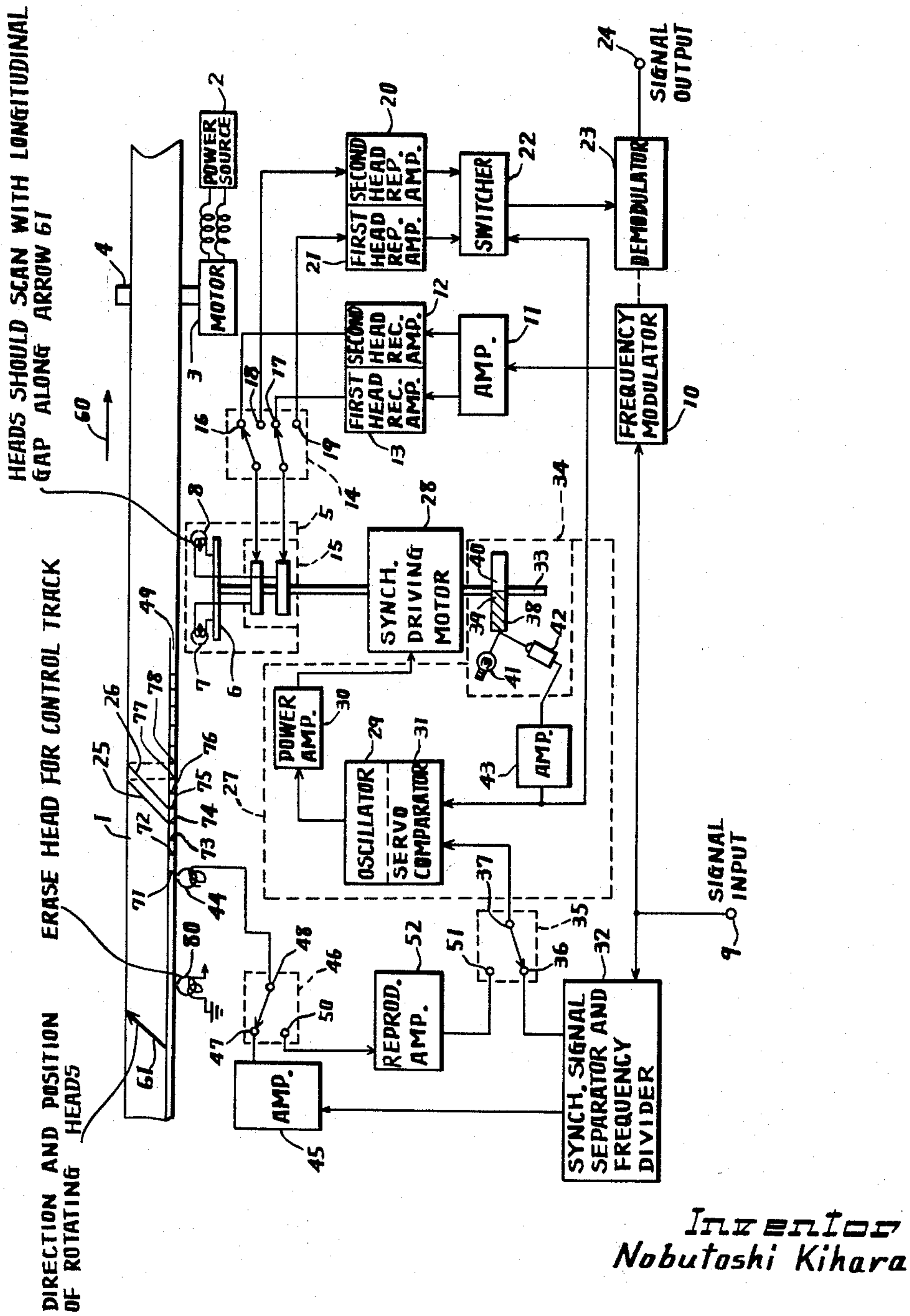
Inventor
Nobutoshi Kihara
by Hill, Sherman, Meroni, Gross & Simpson Attnys.

3,175,034

SYNCHRONIZING SYSTEM FOR MAGNETIC TELEVISION RECORDING

Nobutoshi Kihara, Shibuya-ku, Tokyo, Japan, assignor to Sony Corporation, Tokyo, Japan, a corporation of Japan Filed Mar. 2, 1961, Ser. No. 92,882
Claims priority, application Japan, Mar. 7, 1960, 35/7,637
6 Claims. (Cl. 178—6.6)

This invention relates to a magnetic recording and reproducing device and more particularly to a magnetic recording and reproducing device which is simple in construction and suitable for an industrial television system.

A principal object of this invention is to provide a simple and reliable industrial video tape recording and reproducing apparatus.

Another object of this invention is to provide such a video tape apparatus having a simple and convenient servo-system which provides accurate synchronization.

Further objects, features and advantages of this invention will be apparent from the following detailed description taken in connection with the accompanying drawing in which:

The single figure shows a schematic diagram illustrating one embodiment of video recording and reproducing apparatus according to this invention.

Referring to the drawing, the reference numeral 1 designates a magnetic medium, namely a magnetic tape. The tape is transferred in the direction of arrow 60, by a capstan roller 4 connected to a motor 3 which is driven by a proper power source, for example a commercial electric source 2 of 100 volts and 50 cycles or 60 cycles per second. The reference numeral 5 is applied to a rotary magnetic head assembly generally, and in the drawing two magnetic heads 7 and 8 are mounted on a rotary disc 6 thereby magnetically recording and reproducing.

The following explanation will be made assuming two magnetic heads are carried on disc 6.

This invention is intended to record image signals together with appropriate synchronizing signals, for instance to record video signals obtained from a television receiver, by means of the rotary magnetic head assembly 5. A signal input terminal 9 is indicated in the figure which receives such synchronizing signals along with the image signal. During recording operation signals from this input terminal 9 are applied to a frequency modulator 10 to provide a frequency modulated output. The modulated output signals are amplified in an amplifier 11 and applied to first and second magnetic head amplifiers 12 and 13, and thereafter delivered respectively to the magnetic heads 7 and 8 through recording contact points 16 and 17 of a recording and reproducing changeover switcher 14. As means for adding the recording signal to the rotary magnetic head assembly 5, a heretofore known method such as a slip-ring and brush mechanism 15 or the like can be adopted. The heads 7 and 8 may scan across the tape in the direction and at the position of arrow 61. The successive lines of the video signal are preferably recorded longitudinally, that is with the poles of each head spaced apart in the direction of arrow 61. Thus, magnetic tracks 25 and 26 are traced alternately in order on the magnetic tape 1 by the magnetic heads 7 and 8. Upon reproducing, the magnetic heads 7 and 8 scan on the magnetic tracks 25 and 26, and reproducing signals are received respectively at first and second magnetic head reproducing amplifiers 20 and 21 through reproducing contact points 18 and 19 of the changeover switcher 14. The reproducing signal outputs from these amplifiers 20 and 21 are delivered to a switcher 22 so as to cut off overlapped portions of the two signals and properly synthesize the two signals. Thereafter the synthesized signal is delivered to a demodulator 23. Thus, the same signals as were applied to input terminal 9 during recording are obtained from output terminal 24 during reproduction. The original video signals can thus be obtained from the output terminal 24 of the demodulator 23.

Having thus described generally the components for recording and playback of the video signals, I will hereinafter explain the feature of this invention, that is, a control system for rotating the magnetic head assembly 5 in proper synchronization with the vertical synchronizing component of the input video signal.

In the device according to this invention for recording and reproducing image signals together with the accompanying vertical synchronizing signals as above mentioned, during recording a servo-system 27 controls and drives the rotary head assembly 5 in synchronism with the input vertical synchronizing signals. A control signal related to the input vertical synch signal is recorded on channel 49 of the tape at the beginning or the end of the magnetic tracks 25 and 26 on the tape 1. During reproduction, the servo-system is so constituted as to be controlled by the control signal recorded on channel 49 of the tape 1 and to rotate the head assembly 5 in synchronization therewith. The width of the magnetic tape 1 and the length of a scanning line of one magnetic head as indicated by arrow 61 are so selected that signals recorded on the adjacent control channel 49 such as indicated at 71–78 are in physical alignment with the beginning or end of scanning lines such as indicated at 25 and 26 on the tape. To this end it is preferable to form magnetic tracks obliquely on the tape 1 by arranging the disc 6 in a plane intersecting the tape (which may be formed in an arc configuration at position 61) along a line substantially parallel to lines 25 and 26 (as corrected for tape movement in the direction of arrow 60).

During reproduction, the reproduced control signals related to the vertical synchronizing signals are added to the servo-system 27 which then controls and drives the rotary head assembly 5. The rotary magnetic head assembly 5 then accurately scans the recorded magnetic tracks 25 and 26, thereby reproducing recorded signals.

During both recording and reproducing, the driving motor 3 for magnetic tape 1 is shown as being driven by power source 2 which is not connected to the above mentioned servo-system 27. Motor 3 may, however, be driven by signals of frequency related to the vertical synchronizing signals which are part of the input video signal introduced at input terminal 9, if desired.

As part of the servo-system 27 an oscillator 29, for instance of 60 cycles per second, may energize a driving motor 28 for the rotary magnetic head assembly 5. The output from oscillator 29 is amplified in a power amplifier 30 and the amplified signals then drive the motor 28. A power source having a frequency of 60 cycles per second is mentioned since two rotary heads 7 and 8 and a synchronous motor 28 having four poles are contemplated in the illustrated embodiment. The frequency of the power source which should be used depends upon the number of the rotary magnetic heads and the construction of the motor 28. The precise oscillation frequency of the oscillator 29 at each instant of time is controlled according to the comparison value from comparator 31. The output from comparator 31 represents a comparison of the signal from component 32 (which is related to the input vertical synch signal from 9) and the revolution frequency of the magnetic head assembly 5.

One part of the input video signals from the terminal 9 is selected by the combined synchronizing signal separator and frequency demultiplier 32. At one output terminal of component 32 a signal of frequency related to the synchronizing signal frequency is produced, for instance of 30 cycles per second. This signal is obtained by separating out the vertical synch signal from terminal 9 and dividing the same by two.

On the shaft 33 of the motor 28 is mounted revolution number detecting means 34 for rotary head assembly 5, from which a head rotation frequency signal is delivered. The divided synchronizing signal frequency output from component 32 and the head rotation frequency output from detecting means 34 are applied to the comparator 31 so as to change the oscillation frequency of the oscillator 29 in accordance with any difference between the frequencies of the two oputputs, thereby always recording signals on the tape which are synchronized with the synchronizing signal at terminal 9.

At a connecting neutral point of the combined separator and divider component 32 and comparator 31, a changeover switcher 35 is provided, and its recording contact point 36 is connected to the separator 32 while its movable contact point 37 is connected to the comparator 31.

The head rotation frequency detecting means 34 may comprise a disc 38 disposed on the motor shaft 33, on the periphery of which white and black paint is applied over respective sectors of 180°, thereby forming painted surfaces 39 and 40. A light beam is projected on these painted surfaces 39 and 40 from a light source 41, reflected light from the painted surface 40 being detected as an electrical signal by a photoelectric converter, for instance by a photocell 42. The output from photocell 42 is applied to one input of the comparator 31 through a proper amplifier 43. In the illustrated embodiment substantial reflected light is received at photocell 42 from the white painted surface 40 only, so that a frequency in the neighborhood of 30 cycles per second is generated by detector means 34. Synchronizing signals from the above mentioned separator 32 are also substantially of 30 cycles per second, and hence the two signals can be compared in the comparator 31. The comparison signal related to head rotation frequency can be also produced by a slip-ring and brush mechanism.

Signals from the detecting means 34 are also applied to the switcher 22 to control the synthesis of the reproduction signals from heads 7 and 8 during reproduction.

In order to record the control signal used during reproduction, at one side of the magnetic tape 1 is provided a stationary magnetic head 44, to which synchronizing signals of 30 cycles per second from the synchronous separator 32 are applied through an amplifier 45 and through a recording contact point 47 and movable contact point 48 of a change-over switcher 46. Thus, on one side margin of the tape 1 is formed the track 49, on which the control signals can be recorded. If head 44 is offset from the heads 7 and 8 which are located at position 61 in the direction of tape movement as shown, and if heads 7 and 8 scan the entire width of the tape (while curved or curled accurately), it may be advisable to provide an erase head 80 which would be suitably energized only during the recording operation.

During reproduction, a reproducing contact point 50 of the change-over switcher 46 and a reproducing contact point 51 of the switcher 35 are connected to each other through a reproducing amplifier 52, if desired.

*Summary of operation*

The operation of the device according to this invention will be now described. During recording, the switchers 14, 35 and 46 are in their recording positions and the motors 28 and 3 are energized.

The magnetic tracks 25 and 26 are formed obliquely as shown in the drawing on the magnetic tape 1 by the magnetic heads 7 and 8 which may scan the tape at the position of arrow 61. At the same time synchronizing signals are recorded on the track 49 formed on one side margin of the tape 1 by the magnetic head 44 and at every cycle the magnetic tracks such as 25 and 26 begin at synchronizing marks such as 74 and 75 and end in transverse alignment with marks such as 77 and 78, respectively. The magnetic head assembly 5 rotates in synchronization with the vertical synch signal component at terminal 9, and the vertical synchronizing signals are recorded on channel 49 for control of head rotation during reproduction.

In the case where the rotation of the rotary head assembly 5 becomes slow or fast owing to some cause, a phase difference will be detected by the comparator 31 between the head rotation signal from detector means 34 and the reference signal from component 32. Comparator 31 will then change the oscillation frequency of the oscillator 29 so as to drive the rotary head assembly 5 with the correct rotation frequency. Specifically, if the vertical synchronizing signals are out of phase with the beginning of the magnetic tracks such as 25 and 26 due to a change in the speed of rotation of the head assembly 5, the head speed is so corrected that the vertical synchronizing signals such as 74 and 75 will occur exactly at the beginning of the magnetic tracks.

On the side margins of the tape, the heads 7 and 8 record signals which are slightly overlapped, that is, each head contacts the tape over slightly more than 180° of its arc of travel.

During reproduction all the switchers 14, 35 and 46 are changed over respectively to the reproducing contact points. In such a case, control signals from the vertical synchronizing signal track 49 and signals from the detecting means 34 are applied to the respective inputs of compaartor 31 so as to control the rotary head assembly 5. Accordingly, during reproduction the rotary head assembly 5 scans on the magnetic tracks such as 25 and 26, thereby reliably reproducing signals.

In this invention, as above described, the vertical synchronizing signals arrive at the beginning and the end of the magnetic tracks 25 and 26; hence it is remarkably convenient to change over and pick up the signals at the synchronizing signal position alternately. That is, since the switcher 22 is operated at the vertical synchronizing signal position, it is not necessary to attempt to synthesize a plurality of reproduced signals at horizontal synchronizing signal positions. Consequently the image signal can be easily synthesized without distortion thereof and without generating noise in the signal.

Further, the driving source 2 for the magnetic tape 1 may be a commercial power source, which is simple in construction. Accordingly this invention is remarkably suitable for magnetic recording and reproducing in a closed circuit such as an industrial television system.

It will be understood that many modifications and variations may be effected without departing from the scope of the novel concepts of the present invention.

I claim as my invention:

1. A magnetic video recording and reproducing device comprising a magnetic medium, a magnetic medium driving device to be energized by an independent frequency power source, means for energizing said magnetic medium driving device from said independent frequency power source during both recording and reproducing operation, rotary magnetic head means coupled to said medium, a recording system for delivering an information signal output to said rotary magnetic head means during recording, a reproducing system for receiving an output from said magnetic head means during reproduction, a driving motor for said rotary magnetic head means, an oscillator for energizing said driving motor, rotation frequency detecting device for detecting the rate of rotation of said rotary magnetic head means, a comparator for providing a comparison signal which is determined by the difference between the output of said rotation frequency detecting device and a reference vertical synchronizing signal, means for controlling said oscillator for said driving motor in accordance with said comparison signal, control signal recording and reproducing head means for recording and reproducing a vertical synchronizing signal on said magnetic medium, and a change-over switch for applying the output of said control signal recording and reproducing head means to said comparator during reproduction.

2. A magnetic video recording and reproducing device comprising a magnetic medium, a magnetic medium driving device to be energized by an independent frequency power source, means for energizing said magnetic medium driving device from said independent frequency power source during both recording and reproducing operation, a magnetic head assembly for coupling to said magnetic medium and provided with a plurality of rotary magnetic heads, a recording system for dividing an information signal into two parts and delivering the signals to said rotary magnetic heads of said magnetic head assembly during recording, a reproducing system for receiving the outputs from said magnetic heads during reproduction, a change-over switch for connecting said rotary magnetic heads selectively to said recording and reproducing systems, a switcher for connecting the outputs of said magnetic heads to said reproducing system without an overlap or drop-out, a driving motor for said rotary magnetic heads, an oscillator for energizing said driving motor, a rotation frequency detecting device for detecting the rate of rotation of said rotary magnetic heads, a comparator for obtaining a comparison signal which is determined by the difference between the output of said rotation frequency detecting device and a reference vertical synchronizing signal, means for controlling said oscillator for said driving motor in accordance with said comparison signal, means for controlling said switcher in accordance with the output of said rotation frequency detecting device, control signal recording and reproducing head means for recording and reproducing a vertical synchronizing signal on said magnetic medium, and a change-over switch for applying the output of said control signal recording and reproducing head means to said comparator during reproduction.

3. A magnetic video recording and reproducing device comprising a magnetic medium, a magnetic medium driving device to be energized by an independent frequency power source, means for energizing said magnetic medium driving device from said independent frequency power source during both recording and reproducing operation, a magnetic head assembly for coupling to said magnetic medium and provided with a plurality of rotary magnetic heads, a frequency modulator for modulating a carrier in response to an image information signal including an input vertical synchronizing signal, a plurality of recording amplifiers for amplifying the modulated signal from said frequency modulator, means for delivering the outputs of said amplifiers respectively to said rotary magnetic heads of said magnetic head assembly during recording, reproducing amplifiers for amplifying the outputs from said magnetic heads during reproduction, a change-over switch for connecting said rotary magnetic heads selectively to said recording amplifiers and to said reproducing amplifiers, a switcher for exactly connecting outputs of said reproducing amplifiers without an overlap or drop-out, a demodulator for demodulating the thus obtained signal, a driving motor for said rotary magnetic heads, an oscillator for energizing said driving motor, a rotation frequency detecting device for detecting the rate of rotation of said rotary magnetic heads, a comparator for obtaining a comparison signal which is determined by the difference between the output of said rotation frequency detecting device and a vertical synchronizing signal related to said input vertical synchronizing signal, means for controlling said oscillator for said driving motor in accordance with said comparison signal, means for controlling said switcher in accordance with the output of said rotation frequency detecting device, control signal recording and reproducing head means for recording and reproducing a vertical synchronizing signal on said magnetic medium related to said input vertical synchronizing signal, and a change-over switch for applying the output of said control signal recording and reproducing head means to said comparator during reproduction.

4. A magnetic video recording and reproducing device comprising a magnetic medium, a magnetic medium driving device to be energized by an independent frequency power source, means for energizing said magnetic medium driving device from said independent frequency power source during both recording and reproducing operation, a magnetic head assembly for coupling to said magnetic medium and provided with a plurality of rotary magnetic heads, a frequency modulator for modulating a carrier in response to an image information signal including an input vertical synchronizing signal, a plurality of recording amplifiers for amplifying the modulated signal from said frequency modulator, means for delivering the outputs of said amplifiers respectively to said rotary magnetic heads of said magnetic head assembly during recording, reproducing amplifiers for amplifying the outputs from said magnetic heads during reproduction, a change-over switch for connecting said rotary magnetic heads selectively to said recording amplifiers and to said reproducing amplifiers, a switcher for exactly connecting the outputs of said reproducing amplifiers without an overlap or drop-out, a demodulator for modulating the thus obtained signal, a driving motor for said rotary magnetic heads, an oscillator for energizing said driving motor, a rotation frequency detecting device for detecting the rate of rotation of said rotary magnetic heads, a separating and frequency dividing circuit for receiving said input vertical synchronizing signal and dividing the frequency thereof, a comparator for obtaining a comparison signal which is determined by the difference between the output of said rotation frequency detecting device and that of said dividing circuit, means for controlling said oscillator for said driving motor in accordance with said comparison signal, means for controlling said switcher in accordance with the output of said rotation frequency detecting device, control signal recording and reproducing head means for recording the output of said separating and frequency dividing circuit on said magnetic medium, and a change-over switch for adding the output of said control signal recording and reproducing head means to said comparator during reproduction.

5. A magnetic recording system comprising rotating head means for coupling with a magnetizable record medium moving along a record medium path, a magnetic medium driving device driving said magnetizable record medium to be energized by an independent frequency power source, means for energizing said magnetic medium driving device from said independent frequency power source during recording operation, input means for receiving a signal having an information portion, a relatively high frequency line rate synch signal and a lower frequency frame rate synch signal, means coupled to said input means and to said rotating head means for delivering at least said information portion of said signal to said rotating head means for recording on said record medium along scanning tracks extending transversely to the direction of movement of said record medium along said path, control head means for coupling to said record medium as it moves along said path, means coupled to said input means and to control head means for supplying a control signal to said control head means related to said lower frequency frame rate synch signal, and servo control means responsive to the rate of rotation of said rotating head means and to the frequency of said lower frequency frame rate synch signal and controlling the speed of rotation of said rotating head means to maintain a predetermined positional relationship on the record medium between the control signal recorded thereon by said control head means and the successive traces recorded thereon by said rotating head means.

6. A magnetic reproducing system for reproducing a recorded signal comprising a magnetic record medium having successive lines of an information signal recorded thereon along tracks extending transversely of the record medium and having a control signal which is a function of a frame rate synch signal for said information signal recorded longitudinally of the record medium in substantially uniform positional relationship to said recorded lines of said information signal, a magnetic medium driving device driving said magnetic record medium to be energized by an independent frequency power source, means for energizing said magnetic medium driving device from said independent frequency power source during reproducing operation, control reproducing head means for scanning said record medium longitudinally thereof to reproduce said control signal recorded thereon, rotary magnetic head means for scanning said record medium along the successive transversely extending tracks to reproduce the information signal, servo control means coupled to said control head means and responsive to any difference in phase between the reproduced control signal and the rotation of said rotating head means to correct the rate of rotation of said rotating head means, reproduction signal synthesizing means coupled to said rotating head means to switch between discrete reproduced signal components from said rotating head means, and means responsive to the rate of rotation of said rotary magnetic head means and controlling said synthesizing means for switching said synthesizing means at intervals governed by the rate of rotation of said rotary magnetic head means.

References Cited by the Examiner

UNITED STATES PATENTS

| | | | |
|---|---|---|---|
| 2,876,295 | 3/59 | Irby | 178—6.6 |
| 2,956,114 | 10/60 | Ginsburg et al. | 178—6.6 |
| 2,979,562 | 4/61 | Leyton | 178—6.6 |
| 3,005,056 | 10/61 | Goldmark et al. | 179—100.2 |
| 3,016,428 | 1/62 | Kabell | 178—6.6 |
| 3,037,073 | 5/62 | Roizen | 178—6.6 |
| 3,071,644 | 1/63 | Olive | 178—6.6 |

DAVID G. REDINBAUGH, *Primary Examiner.*

BERNARD KONICK, *Examiner.*